United States Patent
Houh et al.

(10) Patent No.: US 7,801,910 B2
(45) Date of Patent: Sep. 21, 2010

(54) METHOD AND APPARATUS FOR TIMED TAGGING OF MEDIA CONTENT

(75) Inventors: Henry Houh, Lexington, MA (US); Jeffrey Nathan Stern, Belmont, MA (US)

(73) Assignee: Ramp Holdings, Inc., Cambridge, MA (US)

( * ) Notice: Subject to any disclaimer, the term of this patent is extended or adjusted under 35 U.S.C. 154(b) by 96 days.

(21) Appl. No.: 11/444,989

(22) Filed: Jun. 1, 2006

(65) Prior Publication Data

US 2007/0112837 A1 May 17, 2007

Related U.S. Application Data

(63) Continuation-in-part of application No. 11/395,732, filed on Mar. 31, 2006, now abandoned.

(60) Provisional application No. 60/736,124, filed on Nov. 9, 2005.

(51) Int. Cl.
*G06F 17/30* (2006.01)
*G06F 7/00* (2006.01)
*H04N 7/173* (2006.01)

(52) U.S. Cl. ............... 707/765; 707/728; 707/729; 707/746; 725/120

(58) Field of Classification Search ............ 707/102
See application file for complete search history.

(56) References Cited

U.S. PATENT DOCUMENTS

| | | | | |
|---|---|---|---|---|
| 5,613,034 A | 3/1997 | Ney et al. | ............... | 395/2.6 |
| 5,613,036 A | 3/1997 | Strong | ............... | 395/2.52 |
| 6,064,959 A | 5/2000 | Young et al. | | |
| 6,081,779 A | 6/2000 | Besling et al. | ............... | 704/257 |
| 6,112,172 A | 8/2000 | True et al. | | |
| 6,157,912 A | 12/2000 | Kneser et al. | ............... | 704/270 |

(Continued)

FOREIGN PATENT DOCUMENTS

EP  1 008 931 A2  6/2000

(Continued)

OTHER PUBLICATIONS

Christoph Bregler; Video Rewrite: Driving Visual Speech with Audio; ACM; 1997; pp. 1-8.*

(Continued)

*Primary Examiner*—Neveen Abel Jalil
*Assistant Examiner*—Jermaine Mincey
(74) *Attorney, Agent, or Firm*—Goodwin Procter LLP

(57) ABSTRACT

A method and apparatus for timed tagging of content is featured. The method and apparatus can include the steps of, or structure for, obtaining at least one keyword tag associated with discrete media content; generating a timed segment index of discrete media content, the timed segment index identifying content segments of the discrete media content and corresponding timing boundaries of the content segments; searching the timed segment index for a match to the at least one keyword tag, the match corresponding to at least one of the content segments identified in the segment index; and generating a timed tag index that includes the at least one keyword tag and the timing boundaries corresponding to the least one content segment of the discrete media content containing the match.

11 Claims, 14 Drawing Sheets

U.S. PATENT DOCUMENTS

| | | |
|---|---|---|
| 6,345,253 B1 | 2/2002 | Viswanathan |
| 6,418,431 B1 | 7/2002 | Mahajan et al. ............... 707/4 |
| 6,484,136 B1 | 11/2002 | Kanevsky et al. ............. 704/9 |
| 6,501,833 B2 | 12/2002 | Phillips et al. ........... 379/88.07 |
| 6,611,803 B1 | 8/2003 | Furuyama et al. ........... 704/254 |
| 6,671,692 B1* | 12/2003 | Marpe et al. ....................... 1/1 |
| 6,687,697 B2 | 2/2004 | Collins-Thompson et al. . 707/6 |
| 6,697,796 B2* | 2/2004 | Kermani ............................. 1/1 |
| 6,728,673 B2 | 4/2004 | Furuyama et al. ........... 704/254 |
| 6,728,763 B1 | 4/2004 | Chen .......................... 709/219 |
| 6,738,745 B1 | 5/2004 | Navratil et al. .............. 704/277 |
| 6,768,999 B2* | 7/2004 | Prager et al. ........................ 1/1 |
| 6,785,688 B2* | 8/2004 | Abajian et al. ...................... 1/1 |
| 6,816,858 B1 | 11/2004 | Coden et al. ................... 707/5 |
| 6,848,080 B1 | 1/2005 | Lee et al. .................... 715/533 |
| 6,856,997 B2* | 2/2005 | Lee et al. ........................... 1/1 |
| 6,859,799 B1* | 2/2005 | Yuen ................................. 1/1 |
| 6,873,993 B2* | 3/2005 | Charlesworth et al. ............. 1/1 |
| 6,877,134 B1* | 4/2005 | Fuller et al. ................. 715/202 |
| 6,973,428 B2 | 12/2005 | Boguraev et al. ........... 704/251 |
| 6,985,861 B2 | 1/2006 | Van Thong et al. |
| 7,120,582 B1 | 10/2006 | Young et al. |
| 7,260,564 B1 | 8/2007 | Lynn et al. |
| 7,308,487 B1 | 12/2007 | Dansie et al. |
| 2001/0045962 A1 | 11/2001 | Lee et al. .................... 345/745 |
| 2001/0049826 A1* | 12/2001 | Wilf ........................... 725/120 |
| 2002/0069218 A1* | 6/2002 | Sull et al. ................ 707/501.1 |
| 2002/0108112 A1 | 8/2002 | Wallace et al. |
| 2002/0143852 A1 | 10/2002 | Guo et al. .................... 709/201 |
| 2003/0171926 A1 | 9/2003 | Suresh et al. ............ 704/270.1 |
| 2004/0103433 A1 | 5/2004 | Regeard et al. ............... 725/53 |
| 2004/0199502 A1* | 10/2004 | Wong et al. .................... 707/3 |
| 2004/0199507 A1 | 10/2004 | Tawa, Jr. ....................... 707/7 |
| 2005/0033758 A1 | 2/2005 | Baxter ....................... 707/100 |
| 2005/0086692 A1 | 4/2005 | Dudkiewicz et al. |
| 2005/0096910 A1* | 5/2005 | Watson et al. .............. 704/260 |
| 2005/0187965 A1* | 8/2005 | Abajian ...................... 707/102 |
| 2005/0197724 A1 | 9/2005 | Neogi .......................... 700/94 |
| 2005/0216443 A1* | 9/2005 | Morton et al. ................. 707/3 |
| 2005/0229118 A1* | 10/2005 | Chiu et al. ................. 715/864 |
| 2005/0234875 A1 | 10/2005 | Auerbach et al. .............. 707/3 |
| 2005/0256867 A1 | 11/2005 | Walther et al. ................ 707/5 |
| 2006/0015904 A1 | 1/2006 | Marcus ........................ 725/46 |
| 2006/0020662 A1 | 1/2006 | Robinson ................... 709/203 |
| 2006/0020971 A1 | 1/2006 | Poslinski ..................... 725/44 |
| 2006/0047580 A1 | 3/2006 | Saha ........................... 705/26 |
| 2006/0053156 A1 | 3/2006 | Kaushansky et al. ........ 707/102 |
| 2006/0265421 A1 | 11/2006 | Ranasinghe et al. |
| 2007/0005569 A1 | 1/2007 | Hurst-Hiller et al. |
| 2007/0041522 A1 | 2/2007 | Abella et al. |
| 2007/0078708 A1 | 4/2007 | Yu et al. |
| 2007/0100787 A1 | 5/2007 | Lim et al. |

FOREIGN PATENT DOCUMENTS

| | | |
|---|---|---|
| JP | 2004350253 | 9/2004 |
| KR | 2002024865 A1 | 4/2002 |
| WO | WO02/11123 A2 | 2/2002 |
| WO | WO 2005/004442 A1 | 1/2005 |

OTHER PUBLICATIONS

International Search Report for PCT/US2006/043561 dated Apr. 17, 2007 (3 pages).

International Search Report for PCT/US2006/043683 dated Aug. 2, 2007 (3 pages).

Written Opinion of the International Searching Authority for PCT/US2006/043683 dated Aug. 2, 2007 (6 pages).

Stuart, Anne, "SpeechBot: A Search Engine for Sound," http://www.hpl.hp.com/cgi-bn/pf.cgi, last visited on Nov. 6, 2006 (4 pages).

"BBN Audio Indexer," BBN Technologies, A Verizon Company, last visited on Nov. 6, 2006, http://web.archive.org/web/20020214165834/http://www.bbn.com/speech/audioindexer.html, approximately Feb. 14, 2002, as indicated on Wayback Machine website at http://web.archive.org/web/*/http://www.bbn.com/speech/audioindexer.html, last visited on Nov. 6, 2006 (3 pages).

International Search Report for International Application No. PCT/US2006/043680, date of mailing Apr. 27, 2007 (3 pages).

International Search Report for International Application No. PCT/US2006/043682, date of mailing Mar. 30, 2007, including Written Opinion of the International Search Authority (10 pages total).

International Search Report for PCT/US2006/043561, date of mailing May 9, 2007 (3 pages).

Lindblad, Christopher J., et al., "ViewStation Applications: Implications for Network Traffic," IEEE Journal of Selected Areas in Communications, 1995.

Little, T.D.C., et al., "A Digital On-Demand Video Service Supporting Content-Basted Queries,"International Multimedia Conference, Proceedings of the First ACM International Conference on Multimedia, Anaheim, CA, Sep. 1993, 10 pages.

* cited by examiner

FIG. 9

| | | | | |
|---|---|---|---|---|
| ... WS010 | world | start=T10 | end=T11 | duration=... |
| WS011 | baseball | start=T11 | end=T12 | duration=... |
| WS012 | classic | start=T12 | end=T13 | duration=... |
| ... WS020 | world | start=T20 | end=T21 | duration=... |
| WS021 | baseball | start=T21 | end=T22 | duration=... |
| WS022 | classic | start=T22 | end=T23 | duration=... |
| ... WS050 | "steroids" | start=T30 | end=T31 | duration=... |
| ... WS060 | "steroids" | start=T50 | end=T51 | duration=... |
| ... WS070 | "steroids" | start=T70 | end=T71 | duration=... |
| ... MS001 | marker1 | start=T00 | end=T25 | duration=... |
| MS002 | marker2 | start=T25 | end=T99 | duration=... |

1210 (rows WS...), 1220 (rows MS...), 1200

| tag="steroids" | AV1 | start=... | end=... | location=... |
| tag="steroids" | AV2 | start=... | end=... | location=... |
| tag="steroids" | AV3 | start=... | end=... | location=... |
| tag="steroids" | AV4 | start=... | end=... | location=... |
| tag="steroids" | AV5 | start=... | end=... | location=... |

| tag="world baseball classic" | AV1 | start=... | end=... | location=... |
| tag="steroids" | AV1 | start=... | end=... | location=... |

METHOD AND APPARATUS FOR TIMED TAGGING OF MEDIA CONTENT

RELATED APPLICATIONS

This application is a continuation-in-part of U.S. patent application Ser. No. 11/395,732, filed on Mar. 31, 2006, which claims the benefit of U.S. Provisional Application No. 60/736,124, filed on Nov. 9, 2005. The entire teachings of the above applications are incorporated herein by reference.

FIELD OF THE INVENTION

Aspects of the invention relate to methods and apparatus for generating and using enhanced metadata in search-driven applications.

BACKGROUND OF THE INVENTION

As the World Wide Web has emerged as a major research tool across all fields of study, the concept of metadata has become a crucial topic. Metadata, which can be broadly defined as "data about data," refers to the searchable definitions used to locate information. This issue is particularly relevant to searches on the Web, where metatags may determine the ease with which a particular Web site is located by searchers. Metadata that are embedded with content is called embedded metadata. A data repository typically stores the metadata detached from the data.

Results obtained from search engine queries are limited to metadata information stored in a data repository, referred to as an index. With respect to media files or streams, the metadata information that describes the audio content or the video content is typically limited to information provided by the content publisher. For example, the metadata information associated with audio/video podcasts generally consists of a URL link to the podcast, title, and a brief summary of its content. If this limited information fails to satisfy a search query, the search engine is not likely to provide the corresponding audio/video podcast as a search result even if the actual content of the audio/video podcast satisfies the query.

SUMMARY OF THE INVENTION

According to one aspect, the invention features an automated method and apparatus for generating metadata enhanced for audio, video or both ("audio/video") search-driven applications. The apparatus includes a media indexer that obtains an media file or stream ("media file/stream"), applies one or more automated media processing techniques to the media file/stream, combines the results of the media processing into metadata enhanced for audio/video search, and stores the enhanced metadata in a searchable index or other data repository. The media file/stream can be an audio/video podcast, for example. By generating or otherwise obtaining such enhanced metadata that identifies content segments and corresponding timing information from the underlying media content, a number of for audio/video search-driven applications can be implemented as described herein. The term "media" as referred to herein includes audio, video or both.

According to another aspect, the invention features a computerized method and apparatus for timed tagging of media content. According to an embodiment, the method and apparatus can include the steps of, or structure for, obtaining at least one keyword tag associated with discrete media content; generating a timed segment index of discrete media content, the timed segment index identifying content segments of the discrete media content and corresponding timing boundaries of the content segments; searching the timed segment index for a match to the at least one keyword tag, the match corresponding to at least one of the content segments identified in the segment index; and generating a timed tag index that includes the at least one keyword tag and the timing boundaries corresponding to the least one content segment of the discrete media content containing the match.

One or more of the content segments identified in the timed segment index can include word segments, audio speech segments, video segments, or marker segments. For example, one or more of the content segments identified in the timed segment index can include audio corresponding to an individual word, audio corresponding to a phrase, audio corresponding to a sentence, audio corresponding to a paragraph, audio corresponding to a story, audio corresponding to a topic, audio within a range of volume levels, audio of an identified speaker, audio during a speaker turn, audio associated with a speaker emotion, audio separated by sound gaps, audio separated by markers embedded within the media content or audio corresponding to a named entity. One or more of the content segments identified in the timed segment index can also include video of individual scenes, watermarks, recognized objects, recognized faces, overlay text or video separated by markers embedded within the media content.

The computerized method and apparatus can further include the steps of, or structure for, generating a timed segment index of discrete media content, the timed segment index identifying text of audible words from content segments of the discrete media content and corresponding timing boundaries of the content segments; searching the timed segment index for text matching the at least one keyword tag, the matching text corresponding to at least one of the content segments identified in the segment index; and generating a timed tag index that includes the at least one keyword tag and the timing boundaries corresponding to the least one content segment of the discrete media content containing the matching text. The text of audible words from content segments of the discrete media content can be derived from the discrete media content using one or more media processing techniques or obtained from closed caption data associated with the discrete media content. Where the text of the audible words is obtained from closed caption data, the computerized method and apparatus can further include the steps of, or structure for, aligning the text from the closed caption data to timing boundaries corresponding to the content segments of the discrete media content; and generating the timed segment index of discrete media content, the timed segment index identifying the text from the closed caption data aligned to the corresponding timing boundaries of the content segments.

The computerized method and apparatus can further include the step of, or structure for, receiving the keyword tag from a content provider, the keyword tag being associated with the discrete media content by the content provider. The computerized method and apparatus can further include the step of, or structure for, receiving the keyword tag from a content provider, the keyword tag being uploaded along with the discrete media content by the content provider. The computerized method and apparatus can further include the step of, or structure for, receiving the keyword tag from a content provider, the keyword tag being embedded in a content descriptor corresponding to the discrete media content provided by the content provider. The computerized method and apparatus can further include the step of, or structure for, generating the keyword tag from the timed segment index.

The content segments identified in the timed segment index can include word segments, such that each word segment identifies the text of an audible word and the corresponding timing boundaries of the audible word within the discrete media content. Using such an index, the computerized method and apparatus can further include the steps of, or structure for, comparing the at least one keyword tag to the text of the audible word identified in each of the word segments; obtaining the corresponding timing boundaries for at least one of the word segments including the text of an audible word matching to the at least one keyword tag; identifying a broader content segment from the timed segment index having timing boundaries that include the corresponding timing boundaries of the word segment matching to the at least one keyword tag; and mapping the timing boundaries of the broader content segment to the at least one keyword tag in the timed tag index.

The computerized method and apparatus can further include the step of, or structure for, presenting a search result that enables a user to arbitrarily select and commence playback of the discrete media content at any of the content segments associated with the at least one keyword tag using the timing boundaries identified within the timed tag index.

BRIEF DESCRIPTIONS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a diagram that illustrates an exemplary timed segment index for media clip of FIG. 7.

FIGS. 10A and 10B are diagrams that conceptually illustrate a timed tag index.

DETAILED DESCRIPTION

Generation of Enhanced Metadata for Audio/Video

The invention features an automated method and apparatus for generating metadata enhanced for audio/video search-driven applications. The apparatus includes a media indexer that obtains an media file/stream (e.g., audio/video podcasts), applies one or more automated media processing techniques to the media file/stream, combines the results of the media processing into metadata enhanced for audio/video search, and stores the enhanced metadata in a searchable index or other data repository.

Figure 1A:
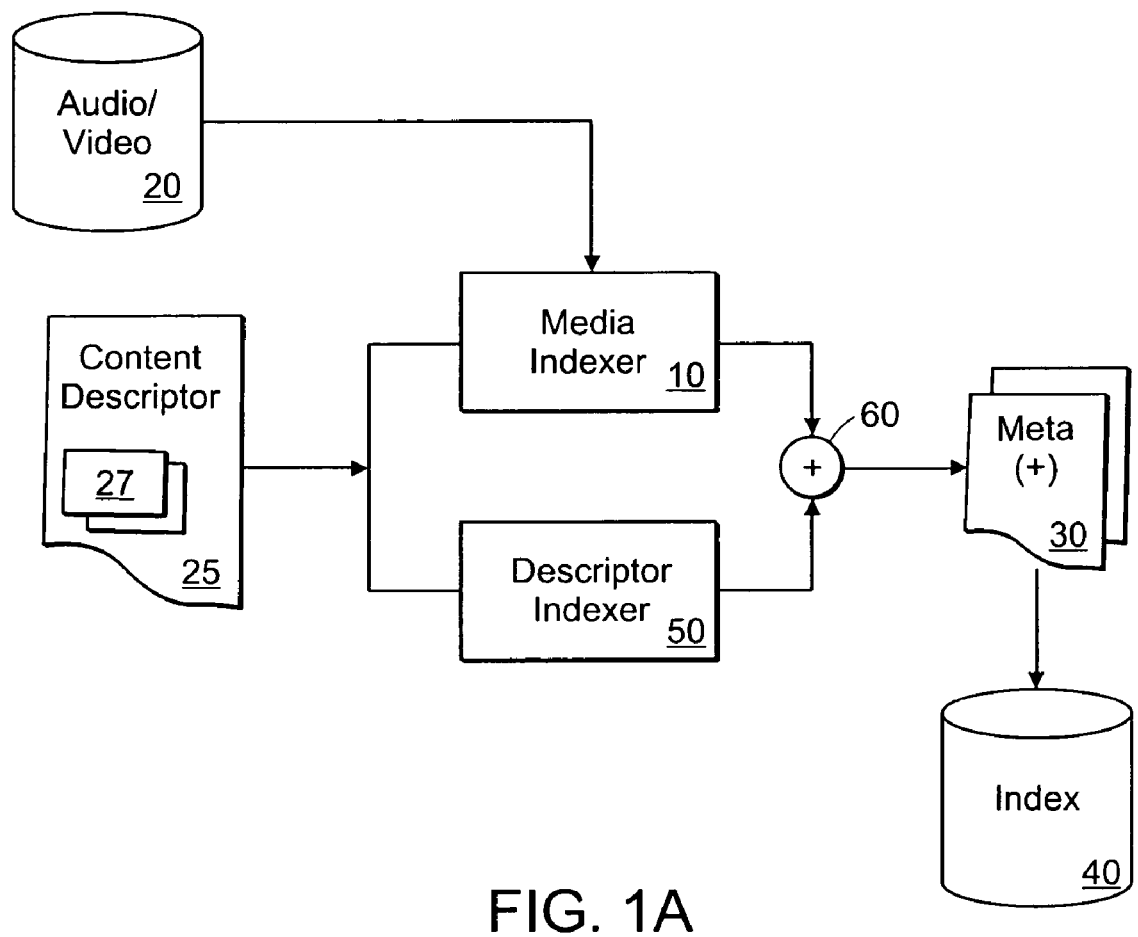
FIG. 1A is a diagram illustrating an apparatus and method for generating metadata enhanced for audio/video search-driven applications.

FIG. 1A is a diagram illustrating an apparatus and method for generating metadata enhanced for audio/video search-driven applications. As shown, the media indexer 10 cooperates with a descriptor indexer 50 to generate the enhanced metadata 30. A content descriptor 25 is received and processed by both the media indexer 10 and the descriptor indexer 50. For example, if the content descriptor 25 is a Really Simple Syndication (RSS) document, the metadata 27 corresponding to one or more audio/video podcasts includes a title, summary, and location (e.g., URL link) for each podcast. The descriptor indexer 50 extracts the descriptor metadata 27 from the text and embedded metatags of the content descriptor 25 and outputs it to a combiner 60. The content descriptor 25 can also be a simple web page link to a media file. The link can contain information in the text of the link that describes the file and can also include attributes in the HTML that describe the target media file.

In parallel, the media indexer 10 reads the metadata 27 from the content descriptor 25 and downloads the audio/video podcast 20 from the identified location. The media indexer 10 applies one or more automated media processing techniques to the downloaded podcast and outputs the combined results to the combiner 60. At the combiner 60, the metadata information from the media indexer 10 and the descriptor indexer 50 are combined in a predetermined format to form the enhanced metadata 30. The enhanced metadata 30 is then stored in the index 40 accessible to search-driven applications such as those disclosed herein.

In other embodiments, the descriptor indexer 50 is optional and the enhanced metadata is generated by the media indexer 10.

Figure 1B:
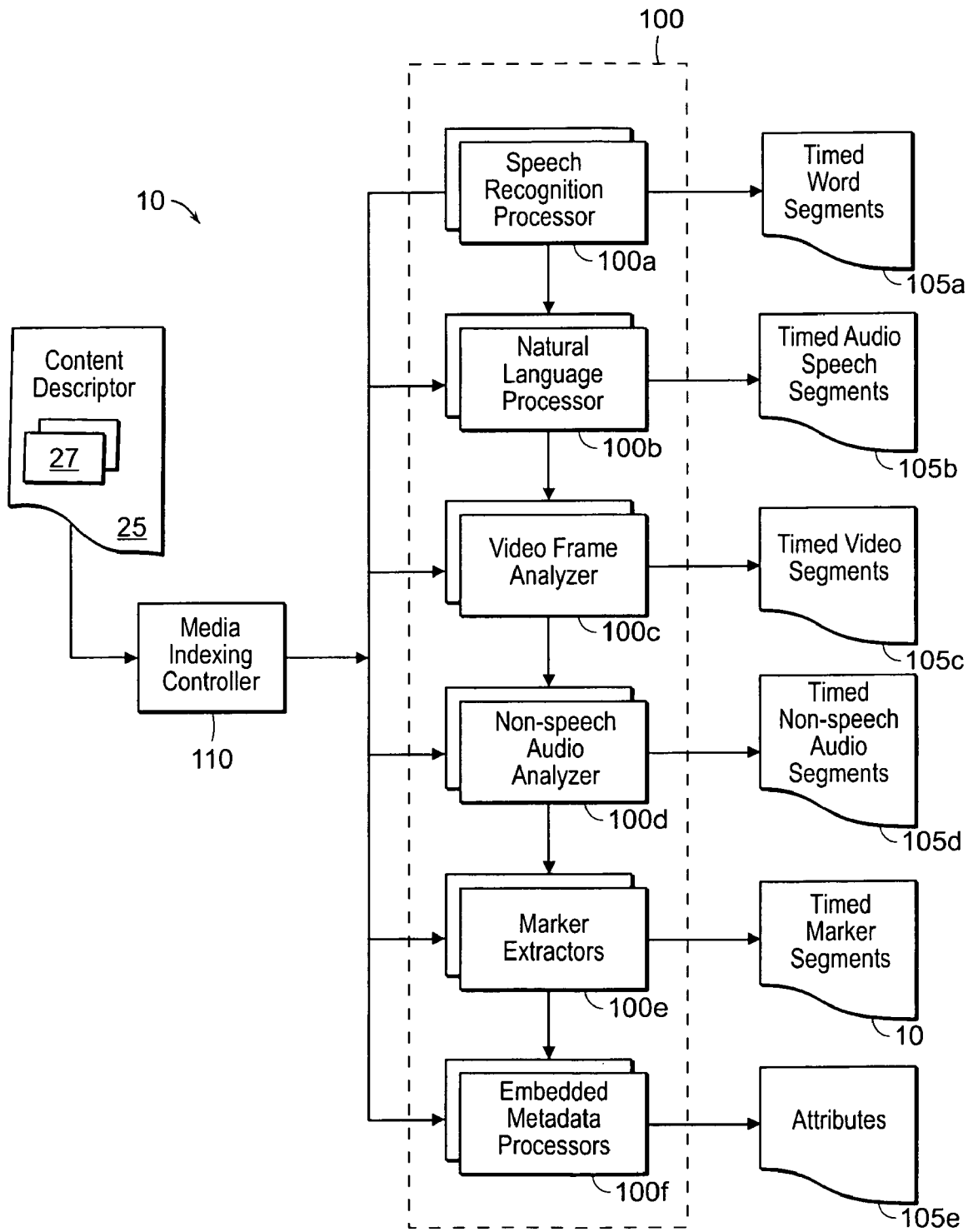
FIG. 1B is a diagram illustrating an example of a media indexer.

FIG. 1B is a diagram illustrating an example of a media indexer. As shown, the media indexer 10 includes a bank of media processors 100 that are managed by a media indexing controller 110. The media indexing controller 110 and each of the media processors 100 can be implemented, for example, using a suitably programmed or dedicated processor (e.g., a microprocessor or microcontroller), hardwired logic, Application Specific Integrated Circuit (ASIC), and a Programmable Logic Device (PLD) (e.g., Field Programmable Gate Array (FPGA)).

A content descriptor 25 is fed into the media indexing controller 110, which allocates one or more appropriate media processors 100a ... 100n to process the media files/streams 20 identified in the metadata 27. Each of the assigned media processors 100 obtains the media file/stream (e.g., audio/video podcast) and applies a predefined set of audio or video processing routines to derive a portion of the enhanced metadata from the media content.

Examples of known media processors 100 include speech recognition processors 100a, natural language processors 100b, video frame analyzers 100c, non-speech audio analyzers 100d, marker extractors 100e and embedded metadata processors 100f. Other media processors known to those skilled in the art of audio and video analysis can also be implemented within the media indexer. The results of such media processing define timing boundaries of a number of content segment within a media file/stream, including timed word segments 105a, timed audio speech segments 105b, timed video segments 105c, timed non-speech audio segments 105d, timed marker segments 105e, as well as miscellaneous content attributes 105f, for example.

Figure 2:
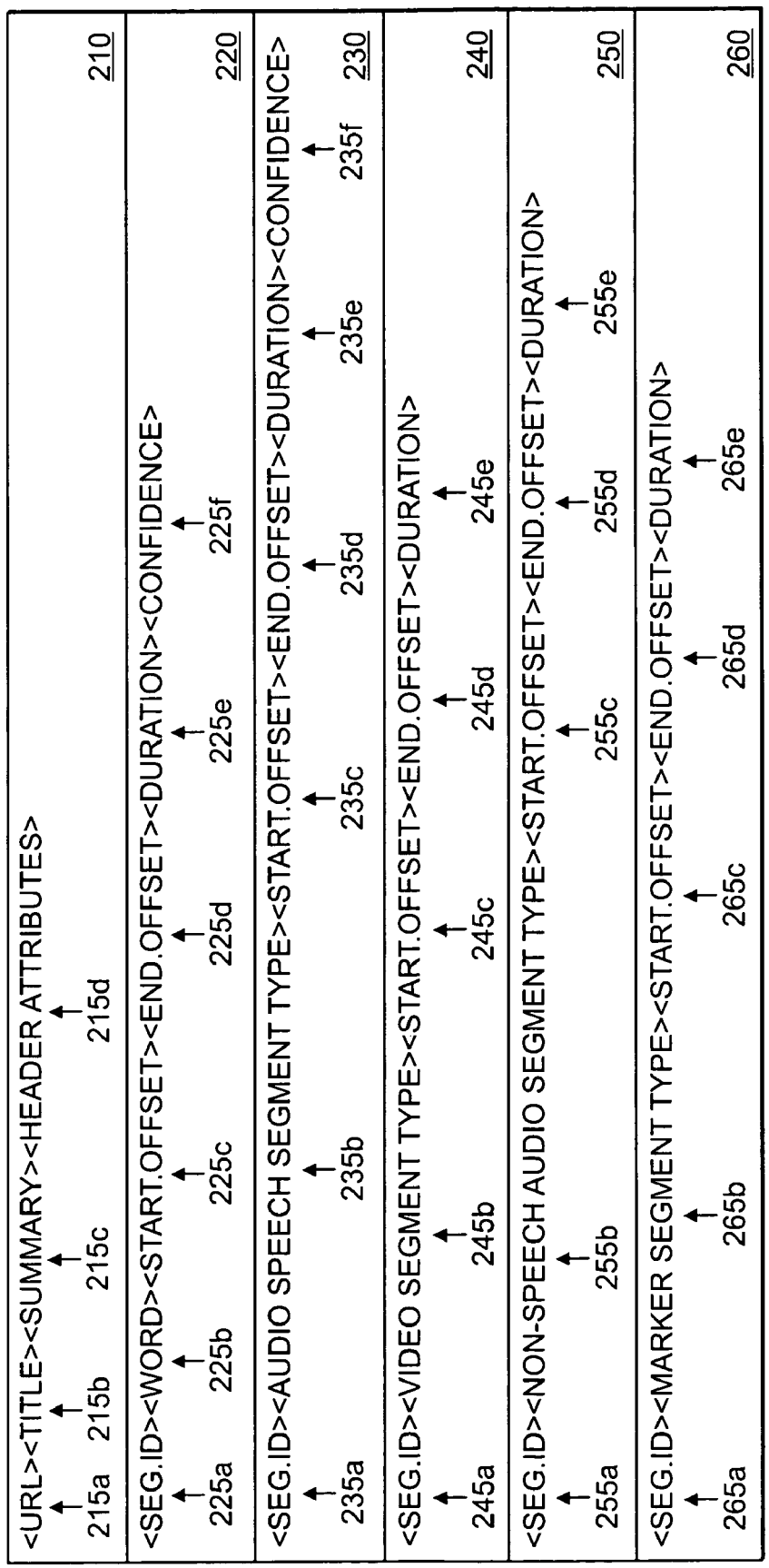
FIG. 2 is a diagram illustrating an example of metadata enhanced for audio/video search-driven applications.

FIG. 2 is a diagram illustrating an example of metadata enhanced for audio/video search-driven applications. As shown, the enhanced metadata 200 include metadata 210 corresponding to the underlying media content generally. For example, where the underlying media content is an audio/video podcast, metadata 210 can include a URL 215a, title 215b, summary 215c, and miscellaneous content attributes 215d. Such information can be obtained from a content descriptor by the descriptor indexer 50. An example of a content descriptor is a Really Simple Syndication (RSS) document that is descriptive of one or more audio/video podcasts. Alternatively, such information can be extracted by an embedded metadata processor 100f from header fields embedded within the media file/stream according to a predetermined format.

The enhanced metadata 200 further identifies individual segments of audio/video content and timing information that defines the boundaries of each segment within the media file/stream. For example, in FIG. 2, the enhanced metadata 200 includes metadata that identifies a number of possible content segments within a typical media file/stream, namely word segments, audio speech segments, video segments, non-speech audio segments, and/or marker segments, for example.

The metadata 220 includes descriptive parameters for each of the timed word segments 225, including a segment identifier 225a, the text of an individual word 225b, timing information defining the boundaries of that content segment (i.e., start offset 225c, end offset 225d, and/or duration 225e), and optionally a confidence score 225f. The segment identifier 225a uniquely identifies each word segment amongst the content segments identified within the metadata 200. The text of the word segment 225b can be determined using a speech recognition processor 100a or parsed from closed caption data included with the media file/stream. The start offset 225c is an offset for indexing into the audio/video content to the beginning of the content segment. The end offset 225d is an offset for indexing into the audio/video content to the end of the content segment. The duration 225e indicates the duration of the content segment. The start offset, end offset and duration can each be represented as a timestamp, frame number or value corresponding to any other indexing scheme known to those skilled in the art. The confidence score 225f is a relative ranking (typically between 0 and 1) provided by the speech recognition processor 100a as to the accuracy of the recognized word.

The metadata 230 includes descriptive parameters for each of the timed audio speech segments 235, including a segment identifier 235a, an audio speech segment type 235b, timing information defining the boundaries of the content segment (e.g., start offset 235c, end offset 235d, and/or duration 235e), and optionally a confidence score 235f. The segment identifier 235a uniquely identifies each audio speech segment amongst the content segments identified within the metadata 200. The audio speech segment type 235b can be a numeric value or string that indicates whether the content segment includes audio corresponding to a phrase, a sentence, a paragraph, story or topic, particular gender, and/or an identified speaker. The audio speech segment type 235b and the corresponding timing information can be obtained using a natural language processor 100b capable of processing the timed word segments from the speech recognition processors 100a and/or the media file/stream 20 itself. The start offset 235c is an offset for indexing into the audio/video content to the beginning of the content segment. The end offset 235d is an offset for indexing into the audio/video content to the end of the content segment. The duration 235e indicates the duration of the content segment. The start offset, end offset and duration can each be represented as a timestamp, frame number or value corresponding to any other indexing scheme known to those skilled in the art. The confidence score 235f can be in the form of a statistical value (e.g., average, mean, variance, etc.) calculated from the individual confidence scores 225f of the individual word segments.

The metadata 240 includes descriptive parameters for each of the timed video segments 245, including a segment identifier 225a, a video segment type 245b, and timing information defining the boundaries of the content segment (e.g., start offset 245c, end offset 245d, and/or duration 245e). The segment identifier 245a uniquely identifies each video segment amongst the content segments identified within the metadata 200. The video segment type 245b can be a numeric value or string that indicates whether the content segment corresponds to video of an individual scene, watermark, recognized object, recognized face, or overlay text. The video segment type 245b and the corresponding timing information can be obtained using a video frame analyzer 100c capable of applying one or more image processing techniques. The start offset 235c is an offset for indexing into the audio/video content to the beginning of the content segment. The end offset 235d is an offset for indexing into the audio/video content to the end of the content segment. The duration 235e indicates the duration of the content segment. The start offset, end offset and duration can each be represented as a timestamp, frame number or value corresponding to any other indexing scheme known to those skilled in the art.

The metadata 250 includes descriptive parameters for each of the timed non-speech audio segments 255 include a segment identifier 225a, a non-speech audio segment type 255b, and timing information defining the boundaries of the content segment (e.g., start offset 255c, end offset 255d, and/or duration 255e). The segment identifier 255a uniquely identifies each non-speech audio segment amongst the content segments identified within the metadata 200. The audio segment type 235b can be a numeric value or string that indicates whether the content segment corresponds to audio of non-speech sounds, audio associated with a speaker emotion, audio within a range of volume levels, or sound gaps, for example. The non-speech audio segment type 255b and the corresponding timing information can be obtained using a non-speech audio analyzer 100d. The start offset 255c is an offset for indexing into the audio/video content to the beginning of the content segment. The end offset 255d is an offset for indexing into the audio/video content to the end of the content segment. The duration 255e indicates the duration of the content segment. The start offset, end offset and duration can each be represented as a timestamp, frame number or value corresponding to any other indexing scheme known to those skilled in the art.

The metadata 260 includes descriptive parameters for each of the timed marker segments 265, including a segment identifier 265a, a marker segment type 265b, timing information defining the boundaries of the content segment (e.g., start offset 265c, end offset 265d, and/or duration 265e). The segment identifier 265a uniquely identifies each video segment amongst the content segments identified within the metadata

200. The marker segment type 265b can be a numeric value or string that can indicates that the content segment corresponds to a predefined chapter or other marker within the media content (e.g., audio/video podcast). The marker segment type 265b and the corresponding timing information can be obtained using a marker extractor 100e to obtain metadata in the form of markers (e.g., chapters) that are embedded within the media content in a manner known to those skilled in the art.

By generating or otherwise obtaining such enhanced metadata that identifies content segments and corresponding timing information from the underlying media content, a number of for audio/video search-driven applications can be implemented as described herein.

Audio/Video Search Snippets

According to another aspect, the invention features a computerized method and apparatus for generating and presenting search snippets that enable user-directed navigation of the underlying audio/video content. The method involves obtaining metadata associated with discrete media content that satisfies a search query. The metadata identifies a number of content segments and corresponding timing information derived from the underlying media content using one or more automated media processing techniques. Using the timing information identified in the metadata, a search result or "snippet" can be generated that enables a user to arbitrarily select and commence playback of the underlying media content at any of the individual content segments.

Figure 3:
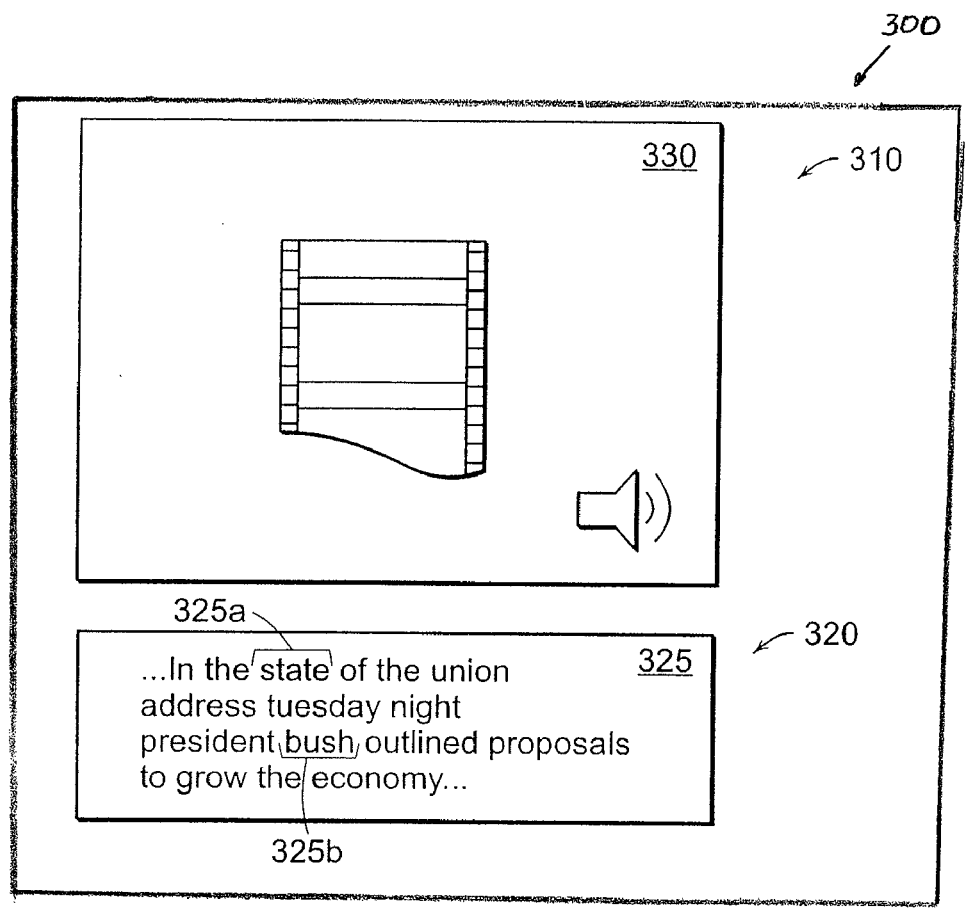
FIG. 3 is a diagram illustrating an example of a search snippet that enables user-directed navigation of underlying media content.

FIG. 3 is a diagram illustrating an example of a search snippet 300 that enables user-directed navigation of underlying media content. The search snippet 310 includes a text area 320 displaying the text 325 of the words spoken during one or more content segments of the underlying media content. A media player 330 capable of audio/video playback is embedded within the search snippet or alternatively executed in a separate window.

The text 325 for each word in the text area 320 is preferably mapped to a start offset of a corresponding word segment identified in the enhanced metadata. For example, an object (e.g. SPAN object) can be defined for each of the displayed words in the text area 320. The object defines a start offset of the word segment and an event handler. Each start offset can be a timestamp or other indexing value that identifies the start of the corresponding word segment within the media content. Alternatively, the text 325 for a group of words can be mapped to the start offset of a common content segment that contains all of those words. Such content segments can include a audio speech segment, a video segment, or a marker segment, for example, as identified in the enhanced metadata of FIG. 2.

Playback of the underlying media content occurs in response to the user selection of a word and begins at the start offset corresponding to the content segment mapped to the selected word or group of words. User selection can be facilitated, for example, by directing a graphical pointer over the text area 320 using a pointing device and actuating the pointing device once the pointer is positioned over the text 325 of a desired word. In response, the object event handler provides the media player 330 with a set of input parameters, including a link to the media file/stream and the corresponding start offset, and directs the player 330 to commence or otherwise continue playback of the underlying media content at the input start offset.

For example, referring to FIG. 3, if a user clicks on the word 325a, the media player 330 begins to plays back the media content at the audio/video segment starting with "state of the union address . . . " Likewise, if the user clicks on the word 325b, the media player 330 commences playback of the audio/video segment starting with "bush outlined . . . "

An advantage of this aspect of the invention is that a user can read the text of the underlying audio/video content displayed by the search snippet and then actively "jump to" a desired segment of the media content for audio/video playback without having to listen to or view the entire media stream.

Figure 4:
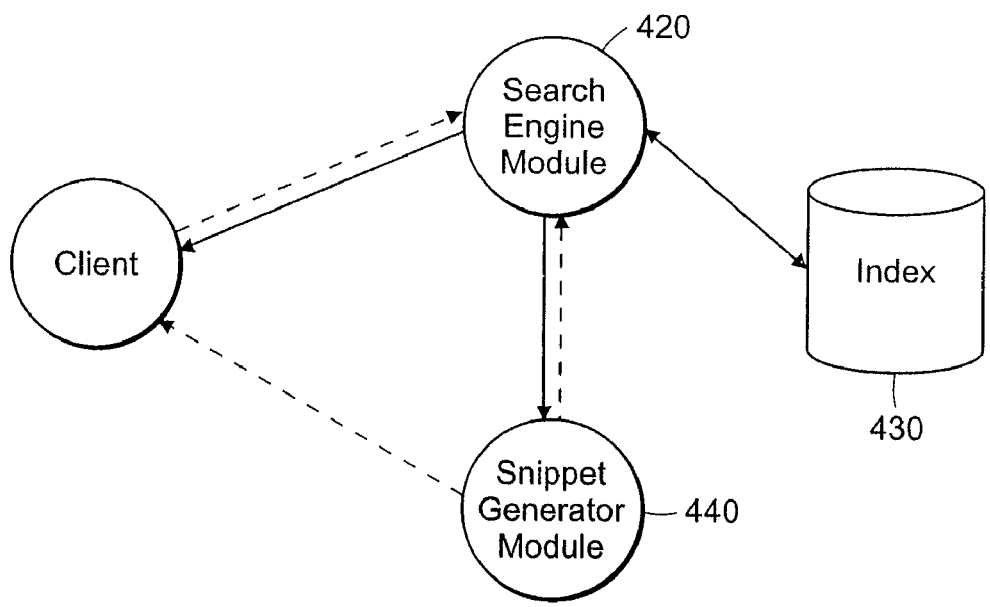
FIGS. 4 and 5 are diagrams illustrating a computerized method and apparatus for generating search snippets that enable user navigation of the underlying media content.
Figure 5:
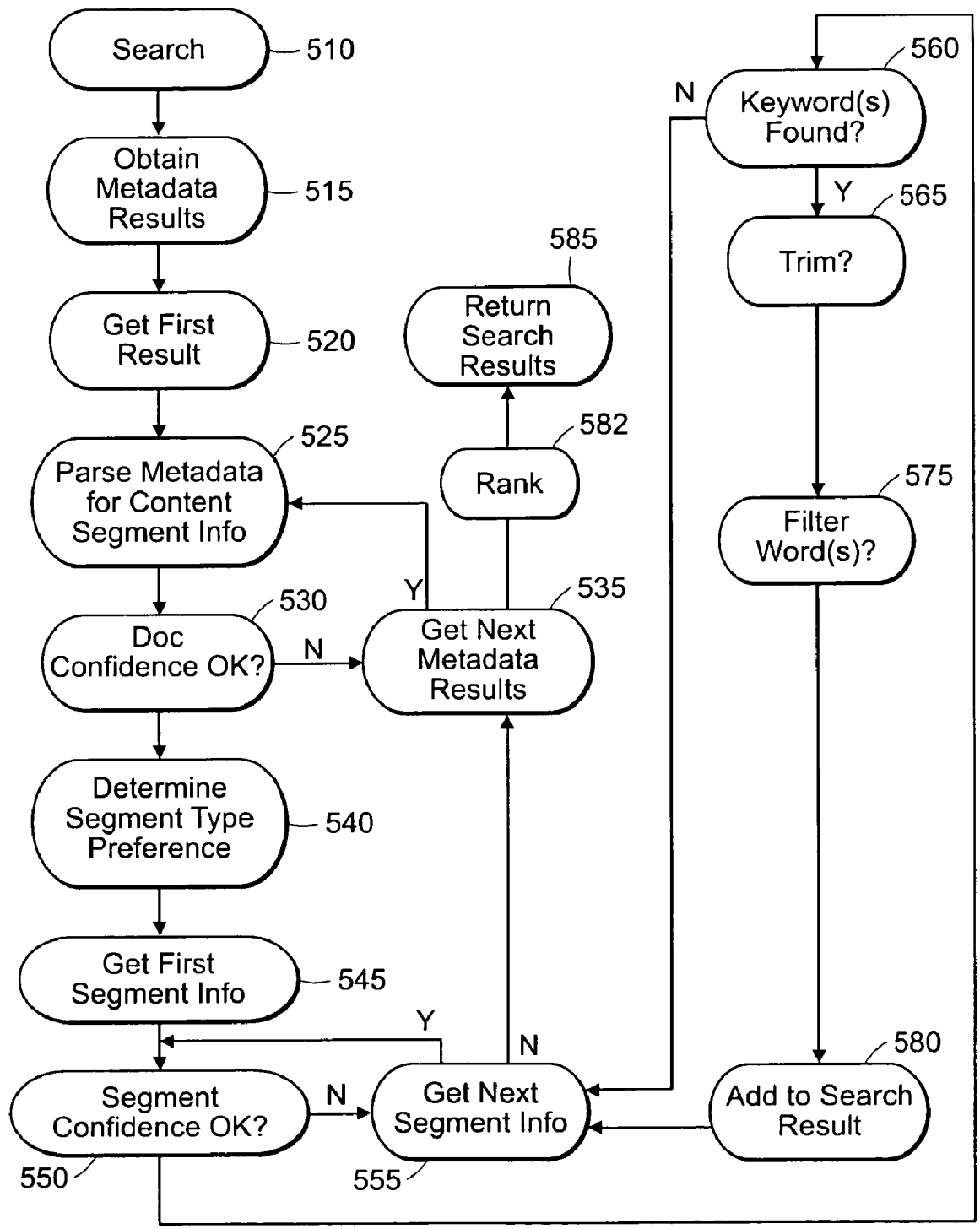

FIGS. 4 and 5 are diagrams illustrating a computerized method and apparatus for generating search snippets that enable user navigation of the underlying media content. Referring to FIG. 4, a client 410 interfaces with a search engine module 420 for searching an index 430 for desired audio/video content. The index includes a plurality of metadata associated with a number of discrete media content and enhanced for audio/video search as shown and described with reference to FIG. 2. The search engine module 420 also interfaces with a snippet generator module 440 that processes metadata satisfying a search query to generate the navigable search snippet for audio/video content for the client 410. Each of these modules can be implemented, for example, using a suitably programmed or dedicated processor (e.g., a microprocessor or microcontroller), hardwired logic, Application Specific Integrated Circuit (ASIC), and a Programmable Logic Device (PLD) (e.g., Field Programmable Gate Array (FPGA)).

FIG. 5 is a flow diagram illustrating a computerized method for generating search snippets that enable user-directed navigation of the underlying audio/video content. At step 510, the search engine 420 conducts a keyword search of the index 430 for a set of enhanced metadata documents satisfying the search query. At step 515, the search engine 420 obtains the enhanced metadata documents descriptive of one or more discrete media files/streams (e.g., audio/video podcasts).

At step 520, the snippet generator 440 obtains an enhanced metadata document corresponding to the first media file/stream in the set. As previously discussed with respect to FIG. 2, the enhanced metadata identifies content segments and corresponding timing information defining the boundaries of each segment within the media file/stream.

At step 525, the snippet generator 440 reads or parses the enhanced metadata document to obtain information on each of the content segments identified within the media file/stream. For each content segment, the information obtained preferably includes the location of the underlying media content (e.g. URL), a segment identifier, a segment type, a start offset, an end offset (or duration), the word or the group of words spoken during that segment, if any, and an optional confidence score.

Step 530 is an optional step in which the snippet generator 440 makes a determination as to whether the information obtained from the enhanced metadata is sufficiently accurate to warrant further search and/or presentation as a valid search snippet. For example, as shown in FIG. 2, each of the word segments 225 includes a confidence score 225f assigned by the speech recognition processor 100a. Each confidence score is a relative ranking (typically between 0 and 1) as to the accuracy of the recognized text of the word segment. To determine an overall confidence score for the enhanced metadata document in its entirety, a statistical value (e.g., average, mean, variance, etc.) can be calculated from the individual confidence scores of all the word segments 225.

Thus, if, at step 530, the overall confidence score falls below a predetermined threshold, the enhanced metadata document can be deemed unacceptable from which to present any search snippet of the underlying media content. Thus, the process continues at steps 535 and 525 to obtain and read/parse the enhanced metadata document corresponding to the next media file/stream identified in the search at step 510. Conversely, if the confidence score for the enhanced metadata in its entirety equals or exceeds the predetermined threshold, the process continues at step 540.

At step 540, the snippet generator 440 determines a segment type preference. The segment type preference indicates which types of content segments to search and present as snippets. The segment type preference can include a numeric value or string corresponding to one or more of the segment types. For example, if the segment type preference can be defined to be one of the audio speech segment types, e.g., "story," the enhanced metadata is searched on a story-by-story basis for a match to the search query and the resulting snippets are also presented on a story-by-story basis. In other words, each of the content segments identified in the metadata as type "story" are individually searched for a match to the search query and also presented in a separate search snippet if a match is found. Likewise, the segment type preference can alternatively be defined to be one of the video segment types, e.g., individual scene. The segment type preference can be fixed programmatically or user configurable.

At step 545, the snippet generator 440 obtains the metadata information corresponding to a first content segment of the preferred segment type (e.g., the first story segment). The metadata information for the content segment preferably includes the location of the underlying media file/stream, a segment identifier, the preferred segment type, a start offset, an end offset (or duration) and an optional confidence score. The start offset and the end offset/duration define the timing boundaries of the content segment. By referencing the enhanced metadata, the text of words spoken during that segment, if any, can be determined by identifying each of the word segments falling within the start and end offsets. For example, if the underlying media content is an audio/video podcast of a news program and the segment preference is "story," the metadata information for the first content segment includes the text of the word segments spoken during the first news story.

Step 550 is an optional step in which the snippet generator 440 makes a determination as to whether the metadata information for the content segment is sufficiently accurate to warrant further search and/or presentation as a valid search snippet. This step is similar to step 530 except that the confidence score is a statistical value (e.g., average, mean, variance, etc.) calculated from the individual confidence scores of the word segments 225 falling within the timing boundaries of the content segment.

If the confidence score falls below a predetermined threshold, the process continues at step 555 to obtain the metadata information corresponding to a next content segment of the preferred segment type. If there are no more content segments of the preferred segment type, the process continues at step 535 to obtain the enhanced metadata document corresponding to the next media file/stream identified in the search at step 510. Conversely, if the confidence score of the metadata information for the content segment equals or exceeds the predetermined threshold, the process continues at step 560.

At step 560, the snippet generator 440 compares the text of the words spoken during the selected content segment, if any, to the keyword(s) of the search query. If the text derived from the content segment does not contain a match to the keyword search query, the metadata information for that segment is discarded. Otherwise, the process continues at optional step 565.

At optional step 565, the snippet generator 440 trims the text of the content segment (as determined at step 545) to fit within the boundaries of the display area (e.g., text area 320 of FIG. 3). According to one embodiment, the text can be trimmed by locating the word(s) matching the search query and limiting the number of additional words before and after. According to another embodiment, the text can be trimmed by locating the word(s) matching the search query, identifying another content segment that has a duration shorter than the segment type preference and contains the matching word(s), and limiting the displayed text of the search snippet to that of the content segment of shorter duration. For example, assuming that the segment type preference is of type "story," the displayed text of the search snippet can be limited to that of segment type "sentence" or "paragraph".

At optional step 575, the snippet generator 440 filters the text of individual words from the search snippet according to their confidence scores. For example, in FIG. 2, a confidence score 225f is assigned to each of the word segments to represent a relative ranking that corresponds to the accuracy of the text of the recognized word. For each word in the text of the content segment, the confidence score from the corresponding word segment 225 is compared against a predetermined threshold value. If the confidence score for a word segment falls below the threshold, the text for that word segment is replaced with a predefined symbol (e.g., - - - ). Otherwise no change is made to the text for that word segment.

At step 580, the snippet generator 440 adds the resulting metadata information for the content segment to a search result for the underlying media stream/file. Each enhanced metadata document that is returned from the search engine can have zero, one or more content segments containing a match to the search query. Thus, the corresponding search result associated with the media file/stream can also have zero, one or more search snippets associated with it. An example of a search result that includes no search snippets occurs when the metadata of the original content descriptor contains the search term, but the timed word segments 105a of FIG. 2 do not.

The process returns to step 555 to obtain the metadata information corresponding to the next content snippet segment of the preferred segment type. If there are no more content segments of the preferred segment type, the process continues at step 535 to obtain the enhanced metadata document corresponding to the next media file/stream identified in the search at step 510. If there are no further metadata results to process, the process continues at optional step 582 to rank the search results before sending to the client 410.

At optional step 582, the snippet generator 440 ranks and sorts the list of search results. One factor for determining the rank of the search results can include confidence scores. For example, the search results can be ranked by calculating the sum, average or other statistical value from the confidence scores of the constituent search snippets for each search result and then ranking and sorting accordingly. Search results being associated with higher confidence scores can be ranked and thus sorted higher than search results associated with lower confidence scores. Other factors for ranking search results can include the publication date associated with the underlying media content and the number of snippets in each of the search results that contain the search term or terms. Any number of other criteria for ranking search results known to those skilled in the art can also be utilized in ranking the search results for audio/video content.

At step 585, the search results can be returned in a number of different ways. According to one embodiment, the snippet generator 440 can generate a set of instructions for rendering each of the constituent search snippets of the search result as shown in FIG. 3, for example, from the raw metadata information for each of the identified content segments. Once the instructions are generated, they can be provided to the search engine 420 for forwarding to the client. If a search result includes a long list of snippets, the client can display the search result such that a few of the snippets are displayed along with an indicator that can be selected to show the entire set of snippets for that search result.

Although not so limited, such a client includes (i) a browser application that is capable of presenting graphical search query forms and resulting pages of search snippets; (ii) a desktop or portable application capable of, or otherwise modified for, subscribing to a service and receiving alerts containing embedded search snippets (e.g., RSS reader applications); or (iii) a search applet embedded within a DVD (Digital Video Disc) that allows users to search a remote or local index to locate and navigate segments of the DVD audio/video content.

According to another embodiment, the metadata information contained within the list of search results in a raw data format are forwarded directly to the client 410 or indirectly to the client 410 via the search engine 420. The raw metadata information can include any combination of the parameters including a segment identifier, the location of the underlying content (e.g., URL or filename), segment type, the text of the word or group of words spoken during that segment (if any), timing information (e.g., start offset, end offset, and/or duration) and a confidence score (if any). Such information can then be stored or further processed by the client 410 according to application specific requirements. For example, a client desktop application, such as iTunes Music Store available from Apple Computer, Inc., can be modified to process the raw metadata information to generate its own proprietary user interface for enabling user-directed navigation of media content, including audio/video podcasts, resulting from a search of its Music Store repository.

Figure 6A:
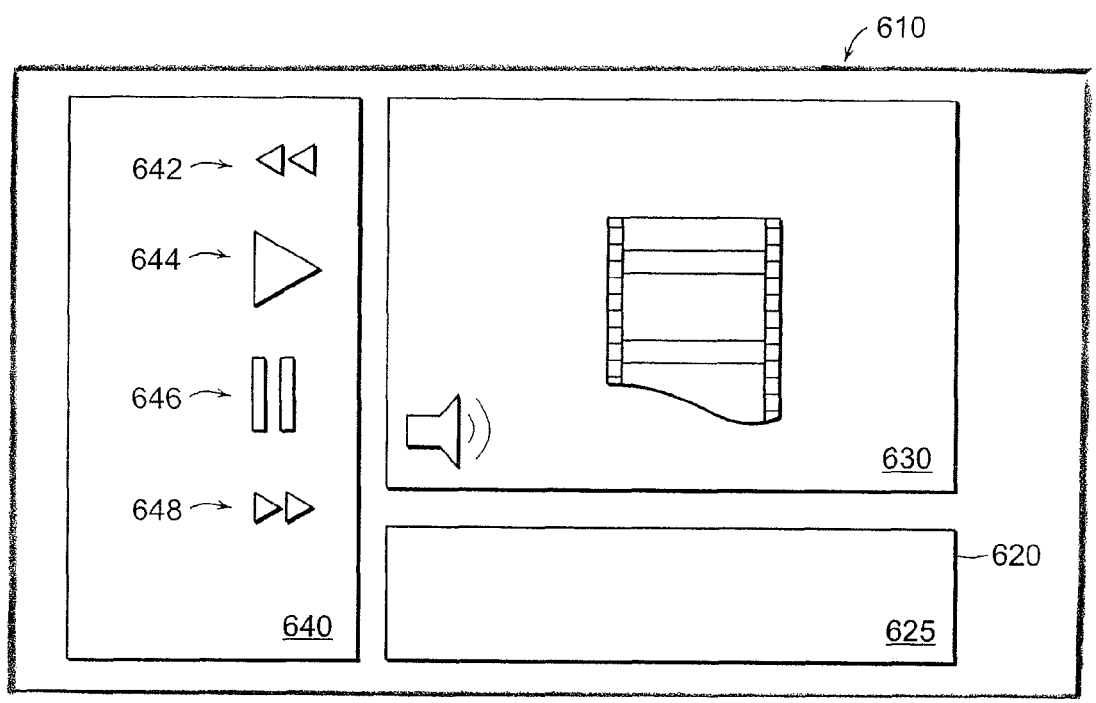
FIG. 6A is a diagram illustrating another example of a search snippet that enables user navigation of the underlying media content.

FIG. 6A is a diagram illustrating another example of a search snippet that enables user navigation of the underlying media content. The search snippet 610 is similar to the snippet described with respect to FIG. 3, and additionally includes a user actuated display element 640 that serves as a navigational control. The navigational control 640 enables a user to control playback of the underlying media content. The text area 620 is optional for displaying the text 625 of the words spoken during one or more segments of the underlying media content as previously discussed with respect to FIG. 3.

Typical fast forward and fast reverse functions cause media players to jump ahead or jump back during media playback in fixed time increments. In contrast, the navigational control 640 enables a user to jump from one content segment to another segment using the timing information of individual content segments identified in the enhanced metadata.

As shown in FIG. 6A, the user-actuated display element 640 can include a number of navigational controls (e.g., Back 642, Forward 648, Play 644, and Pause 646). The Back 642 and Forward 648 controls can be configured to enable a user to jump between word segments, audio speech segments, video segments, non-speech audio segments, and marker segments. For example, if an audio/video podcast includes several content segments corresponding to different stories or topics, the user can easily skip such segments until the desired story or topic segment is reached.

Figure 6B:
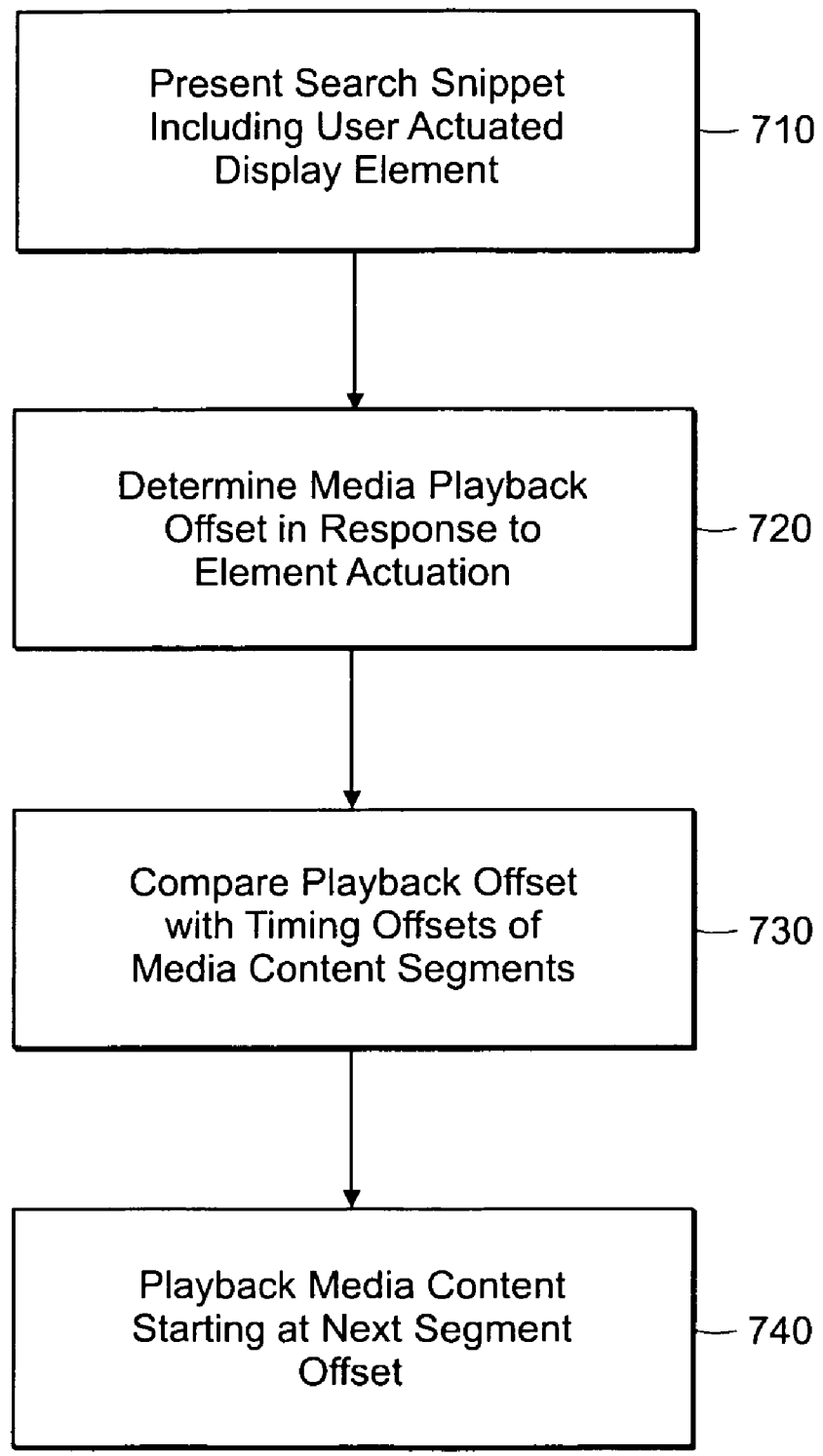
FIGS. 6B and 6C are diagrams illustrating a method for navigating media content using the search snippet of FIG. 6A.
Figure 6C:
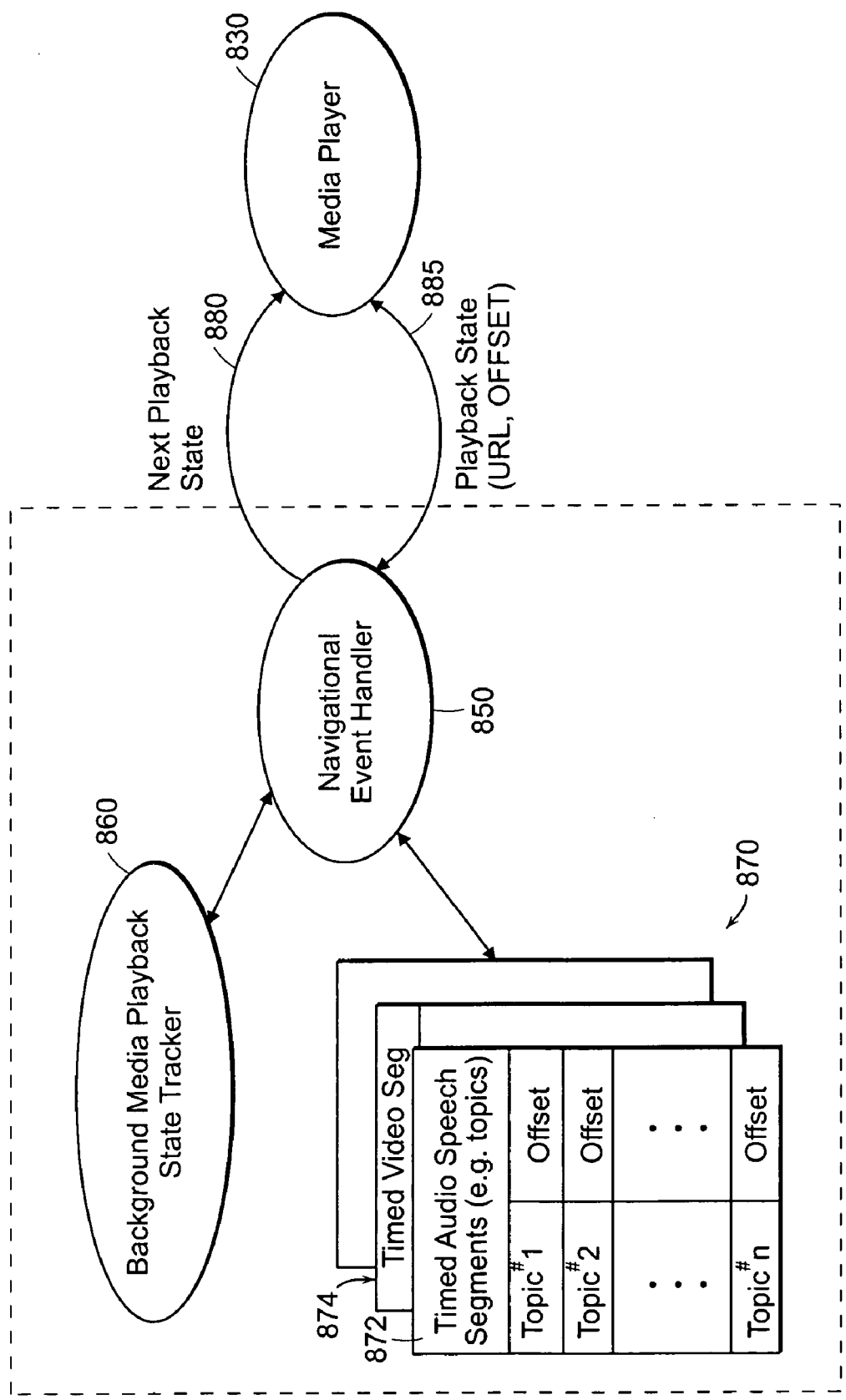

FIGS. 6B and 6C are diagrams illustrating a method for navigating media content using the search snippet of FIG. 6A. At step 710, the client presents the search snippet of FIG. 6A, for example, that includes the user actuated display element 640. The user-actuated display element 640 includes a number of individual navigational controls (i.e., Back 642, Forward 648, Play 644, and Pause 646). Each of the navigational controls 642, 644, 646, 648 is associated with an object defining at least one event handler that is responsive to user actuations. For example, when a user clicks on the Play control 644, the object event handler provides the media player 630 with a link to the media file/stream and directs the player 630 to initiate playback of the media content from the beginning of the file/stream or from the most recent playback offset.

At step 720, in response to an indication of user actuation of Forward 648 and Back 642 display elements, a playback offset associated with the underlying media content in playback is determined. The playback offset can be a timestamp or other indexing value that varies according to the content segment presently in playback. This playback offset can be determined by polling the media player or by autonomously tracking the playback time.

For example, as shown in FIG. 6C, when the navigational event handler 850 is triggered by user actuation of the Forward 648 or Back 642 control elements, the playback state of media player module 830 is determined from the identity of the media file/stream presently in playback (e.g., URL or filename), if any, and the playback timing offset. Determination of the playback state can be accomplished by a sequence of status request/response 855 signaling to and from the media player module 830. Alternatively, a background media playback state tracker module 860 can be executed that keeps track of the identity of the media file in playback and maintains a playback clock (not shown) that tracks the relative playback timing offsets.

At step 730 of FIG. 6B, the playback offset is compared with the timing information corresponding to each of the content segments of the underlying media content to determine which of the content segments is presently in playback. As shown in FIG. 6C, once the media file/stream and playback timing offset are determined, the navigational event handler 850 references a segment list 870 that identifies each of the content segments in the media file/stream and the corresponding timing offset of that segment. As shown, the segment list 870 includes a segment list 872 corresponding to a set of timed audio speech segments (e.g., topics). For example, if the media file/stream is an audio/video podcast of an episode of a daily news program, the segment list 872 can include a number of entries corresponding to the various topics discussed during that episode (e.g., news, weather, sports, entertainment, etc.) and the time offsets corresponding to the start of each topic. The segment list 870 can also include a video segment list 874 or other lists (not shown) corresponding to timed word segments, timed non-speech audio segments, and timed marker segments, for example. The segment lists 870 can be derived from the enhanced metadata or can be the enhanced metadata itself.

At step 740 of FIG. 6B, the underlying media content is played back at an offset that is prior to or subsequent to the offset of the content segment presently in playback. For example, referring to FIG. 6C, the event handler 850 compares the playback timing offset to the set of predetermined timing offsets in one or more of the segment lists 870 to determine which of the content segments to playback next. For example, if the user clicked on the "forward" control 848, the event handler 850 obtains the timing offset for the content segment that is greater in time than the present playback offset. Conversely, if the user clicks on the "backward" control 842, the event handler 850 obtains the timing offset for the content segment that is earlier in time than the present playback offset. After determining the timing offset of the next segment to play, the event handler 850 provides the media player module 830 with instructions 880 directing playback of the media content at the next playback state (e.g., segment offset and/or URL).

Thus, an advantage of this aspect of the invention is that a user can control media using a client that is capable of jumping from one content segment to another segment using the timing information of individual content segments identified in the enhanced metadata. One particular application of this technology can be applied to portable player devices, such as the iPod audio/video player available from Apple Computer, Inc. For example, after downloading a podcast to the iPod, it is unacceptable for a user to have to listen to or view an entire podcast if he/she is only interested in a few segments of the content. Rather, by modifying the internal operating system software of iPod, the control buttons on the front panel of the iPod can be used to jump from one segment to the next segment of the podcast in a manner similar to that previously described.

Timed Tagging of Media Content

Keyword tags have been used to associate audio and video files with keywords that are descriptive of the content of such media files. An audio/video file or stream can be tagged in a number of different ways. For example, a content provider can publish a content descriptor document, such as a web page or RSS document, that includes a link and one or more keyword tags corresponding to an audio/video file or stream. Keyword tags can also be embedded within the audio/video file itself. For example, the specifications for MPEG-1 Audio Layer 3, more commonly referred to as MP3, defines a field for reading and writing keyword tags (e.g., ID3V1 tag). Using such tags, online systems, such as search engines, can store indexes of tagged media files and allow end users to search for desired audio/video content through keyword searches of matching tags. Particular online systems, such as YouTube at www.youtube.com, also enable an end user to tag and upload audio/video files themselves to a database to allow others to search and access tagged media files.

Figure 7:
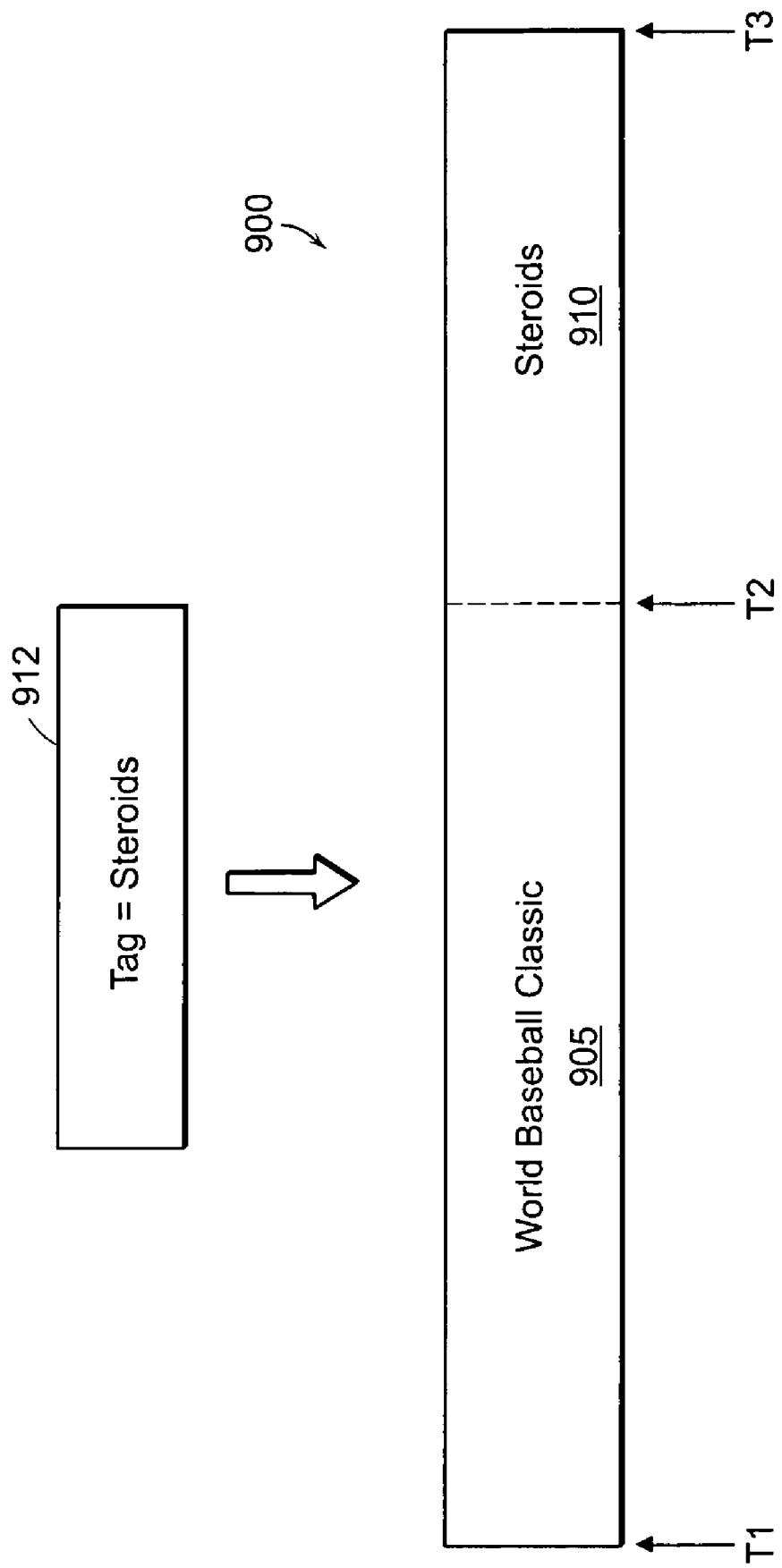
FIG. 7 is a diagram that illustrates the concept of a tagged media file.

A disadvantage of such methods for tagging audio/video content is that a keyword tag is associated with the media file generally. In other words, a tag for a tagged media files is not associated with a particular point or segment of the audio/video content. FIG. 7 is a diagram that illustrates the concept of a tagged media file. In this example, the media file 900 is a video clip from a sports news program in which the topics of discussion include the World Baseball Classic 905 and the effect of steroids in sports 910. Media clip 900 is organized such that the World Baseball Classic segment starts at time T1, which precedes the steroid segment starting at time T2. The associated keyword tag 912 is "steroids." Assuming that an end user establishes a connection to a search engine and conducts a search for audio/video associated with the tag "steroids," the user might be presented with a search result including a link to the media clip of FIG. 7. However, the end user must listen or watch the Word Baseball Classic segment 905 before reaching the steroids segment 910. The user can try to fast forward past the World Baseball Classic segment 905, but the user is unlikely to know where the steroids segment 910 starts.

Thus, according to another aspect, the invention features a computerized method and apparatus for timed tagging of media content. The method and apparatus can include the steps of, or structure for, obtaining at least one keyword tag associated with discrete media content; generating a timed segment index of discrete media content, the timed segment index identifying content segments of the discrete media content and corresponding timing boundaries of the content segments; searching the timed segment index for a match to the at least one keyword tag, the match corresponding to at least one of the content segments identified in the segment index; and generating a timed tag index that includes the at least one keyword tag and the timing boundaries corresponding to the least one content segment of the discrete media content containing the match.

Figure 8A:
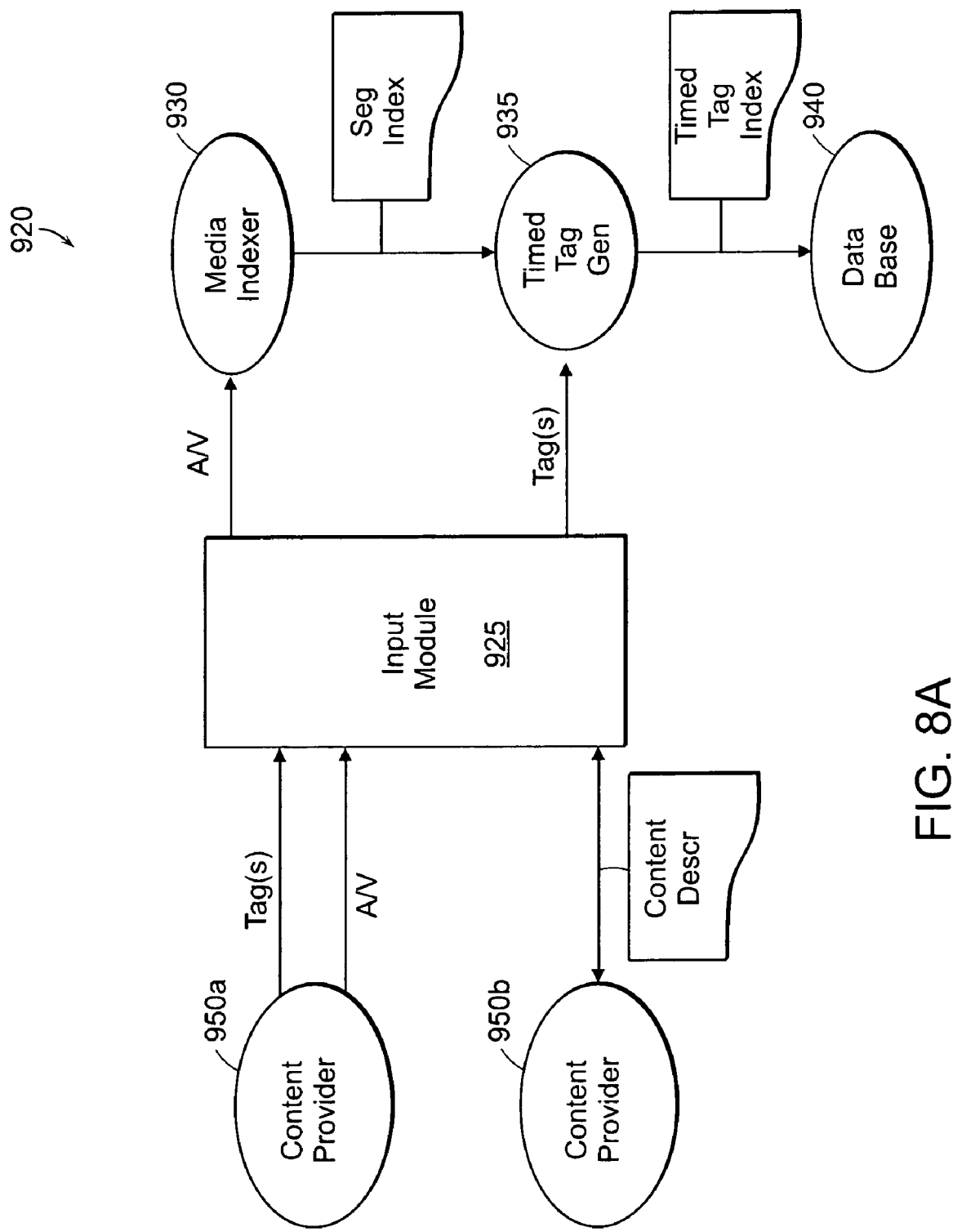
FIG. 8A is a diagram that illustrates a system including an apparatus for timed tagging of media content.

FIG. 8A is a diagram that illustrates a system including an apparatus for timed tagging of media content. The apparatus 920 includes a number of modules. As shown, the apparatus 920 includes an input module 925, a media indexer module 930, a timed tag generator module 935 and a database 940. The database 940 can be accessible to a search engine, for example (not shown).

Figure 8B:
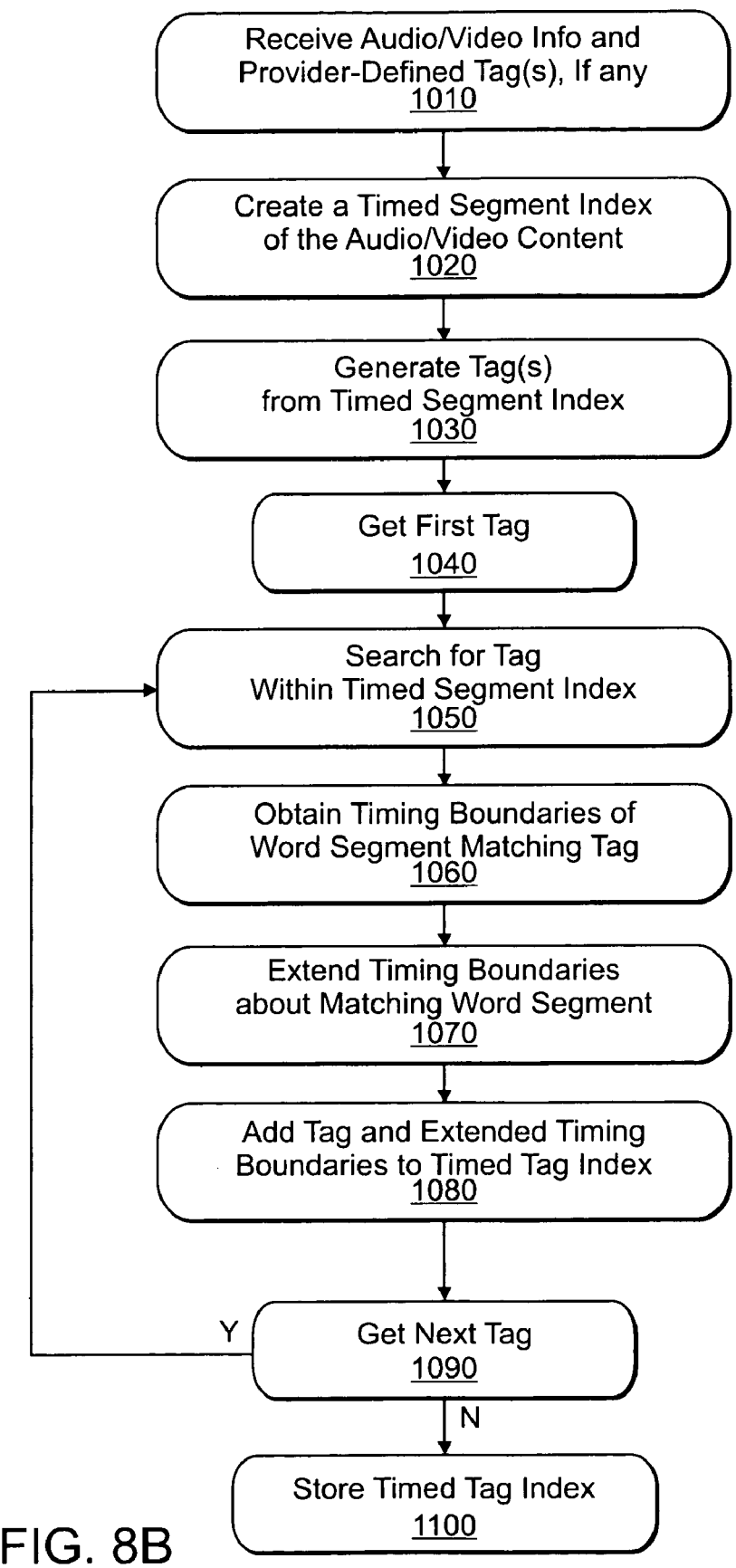
FIG. 8B is a flow diagram that illustrates a method for timed tagging of media content according to the apparatus of FIG. 8A.

FIG. 8B is a flow diagram that illustrates a method for timed tagging of media content according to the apparatus of FIG. 8A. At step 1010, the input module 925 provides an interface for receiving information regarding an audio/video file or stream and optionally a corresponding set of keyword tags from a content provider 950. For example, according to one embodiment, the input module 925 can provide a graphical or text-based user interface that is capable of being presented to a content provider 950a (e.g., user) through a browser. Through such an interface, the content provider 950a can upload an audio/video file and an optional set of provider-defined keyword tags to be associated with the media file. According to another embodiment, the content provider 950b can push to the input module 925, or alternatively, the input module 925 can pull from the content provider 950b, a content descriptor that includes a link to a corresponding audio/video file or stream (e.g., RSS document, web page, URL link) and an optional set of keyword tags embedded within the content descriptor.

The input module 925 transmits the information regarding the audio/video file or stream to the media indexer 930, and transmits the optional set of provider-defined tags to the timed tag generator 935. For example, where the content provider 950a uploads the audio/video file and the optional set of provider-defined keyword tags to the input module 925, the input module can simply pass the data directly to the media indexer and timed tag generator respectively. Where the information regarding the audio/video file or stream and the optional set of keyword tags are embedded within a content descriptor, the input module 925 can process the content descriptor to extract the link to the media file or stream and the optional set of tags. Once the link and tags have been extracted from the descriptor document, the input module 925 can forward them to the media indexer 930 and timed tag generator 935, respectively. If a link to the media file is provided to the media indexer 930, the media indexer uses the link to retrieve the media file or stream for further processing.

At step 1020, the media indexer 930 creates a timed segment index from the audio/video content of the media file. For example, as previously described with respect to FIGS. 1B and 2, the timed segment index 200 (or enhanced metadata) can identify a number of timed word segments 220 corresponding to the audio portion of the media file. Each of the timed word segments 220 can include a segment identifier 225a, the text of an individual word 225b, timing information defining the boundaries of that content segment (i.e., start offset 225c, end offset 225d, and/or duration 225e), and optionally a confidence score 225f. In addition to the timed word segments, the segment index can also include one or more of the other types of content segments (e.g., audio speech segment 230, video segment 240, marker segment 260). The media indexer 930 then transmits the segment index to the timed tag generator 935.

At optional step 1030, the timed tag generator 935 can automatically generate tags from the timed segment index 200. Upon receiving the segment index 200, the timed tag generator 935 can generate additional tags according to a number of different ways. For example, the series of timed word segments 220 include the text of the words spoken during the audio portion of the media file. The timed tag generator 935 can read these words and employ an algorithm that maintains a word count for each word and generates a new tag for the top "n" words that exceed a threshold count. The timed tag generator 935 can employ an algorithm that compares the text of the words to a predetermined list of tags. If a match is found, the matching tag is added to the list of provider-defined tags. The timed tag generator 935 can employ a named entity extractor module, such as those known in the art, to read the text of the words, obtain a list of people, places or things, for example, and then use one or more of the named entities as keyword tags.

For example, FIG. 9 is a diagram that illustrates an exemplary timed segment index for media clip of FIG. 7. In this example, the timed segment index 1200 includes a set of word segments 1210 and a set of marker segments 1220. Marker segments 1220 can be defined by markers can be embedded in the audio/video content by the content provider that indicate the beginning and/or end of a content segment. Markers can also be embedded in a content descriptor corresponding to an audio/video file or stream. For example, a content provider can publish a web page that includes a link to an audio/video file and specifies in the text of the descriptor the beginning and end of content segments (e.g., "The discussion on the Word Baseball Classic starts at time T1 and ends at time T2 . . . "). The corresponding media clip is associated with provider-defined tag "steroids." However, by applying one or more of the techniques to the segment index 1200, such as those previously described in optional step 1030, the timed tag generator 935 can also identify the words "world baseball classic" spoken during segment 905 of the media clip 900 as an additional tag.

Referring back to FIG. 8B at step 1040, the timed tag generator 935 obtains the first tag from the list of provider-defined tags and/or automatically generated tags associated with the media file. At step 1050, the timed tag generator 935 searches for the tag within the timed segment index. For example, with respect to the timed segment index of FIG. 9, the timed tag generator 935 can search for the tag "steroids" within the set of timed word segments 1210 that provide the text of the words spoken during the audio portion of the media file. The timed tag generator 935 can compare the text of one or more word segments to the tag. If there is a match, the process continues at step 1060.

At step 1060, the timing boundaries are obtained for the matching word segment, or segments in the case of a multi-word tag. The timing boundaries of a word segment can include a start offset and an end offset, or duration, as previously described with respect to FIG. 2. These timing boundaries define the segment of the media content when the particular tag is spoken. For example, in FIG. 9, the first word segment containing the tag "steroids" is word segment WS050 having timing boundaries of T30 and T31. At step 1070, the timing boundaries of the matching word segment(s) containing the tag are extended by comparing the timing boundaries of the matching word segment to the timing boundaries of the other types of content segments (e.g., audio speech segment, video segment, marker segment as previously described in FIG. 2). If the timing boundaries of the matching word segment fall within the timing boundaries of a broader content segment, the timing boundaries for the tag can be extended to coincide with the timing boundaries of that broader content segment.

For example, in FIG. 9, marker segments MS001 and MS002 defining timing boundaries that contain a plurality of the word segments 1210. In this example, marker segment MS001 defines the timing boundaries for the World Baseball Classic segment, and marker segment MS002 defines the timing boundaries for the steroids segment. The timed tag generator 935 searches for the first word segment containing the keyword tag "steroids" in the text of the timed word segments 1210, and obtains the timing boundaries for the matching word segment WS050, namely start offset T30 and end offset T31. The timed tag generator 935 then expands the timing boundaries for the tag by comparing the timing boundaries T30 and T31 against the timing boundaries for marker segments MS001 and MS002. Since the timing boundaries of the matching word segment falls within the timing boundaries of marker segment MS002, namely start offset T25 and end offset T99, the keyword tag "steroids" is mapped to the timing boundaries T25 and T99. Similarly, the second and third instances of the keyword tag "steroids" in word segments WS060 and WS070 fall within the timing boundaries of marker segment MS002, and thus the timing boundaries associated with tag "steroids" do not change. Where multiple instances of the tag cannot be found in multiple non-contiguous content segments, the tag can be associated with multiple timing boundaries corresponding to each of the broader segments.

Referring back to FIG. 8B at step 1080, the timed tag generator creates or obtains a timed tag index for the audio/video file and maps the tag to the extended timing boundaries. For example, FIGS. 10A and 10B are diagrams that conceptually illustrate a timed tag index. As shown in FIG. 10A, the timed tag index 1250 can be implemented as a table corresponding to a specific tag (e.g., "steroids"). The entries of the table can include identifiers (e.g., AV1 . . . AV5) for each of audio/video files associated with the specific tag, the timing boundaries of the audio/video content associated with the tag (e.g. "start= . . . ", "end= . . . ") and links or pointers to the audio/video files in the database or other remote locations (e.g., "location= . . . "). As shown in FIG. 10B, the timed tag index 1255 can also be implemented as a table corresponding to a specific media file. The entries of the table includes one or more specific tags associated with the media file, the timing boundaries of the audio/video content associated with each tag, and a link or pointer to the audio/video file in the database or other remote location.

Referring back to FIG. 8B at step 1090, the timed tag generator 935 obtains the next tag from the list of provider-defined tags and/or automatically generated tags associated with the media file. If another tag is available, the process continues returning back to step 1050. Conversely, if all of the tags from the list have been processed, the process continues at step 1100 in which the timed tag generator 935 stores the timed tag index and optionally the audio/video file, itself in the searchable database 940.

Figure 11:
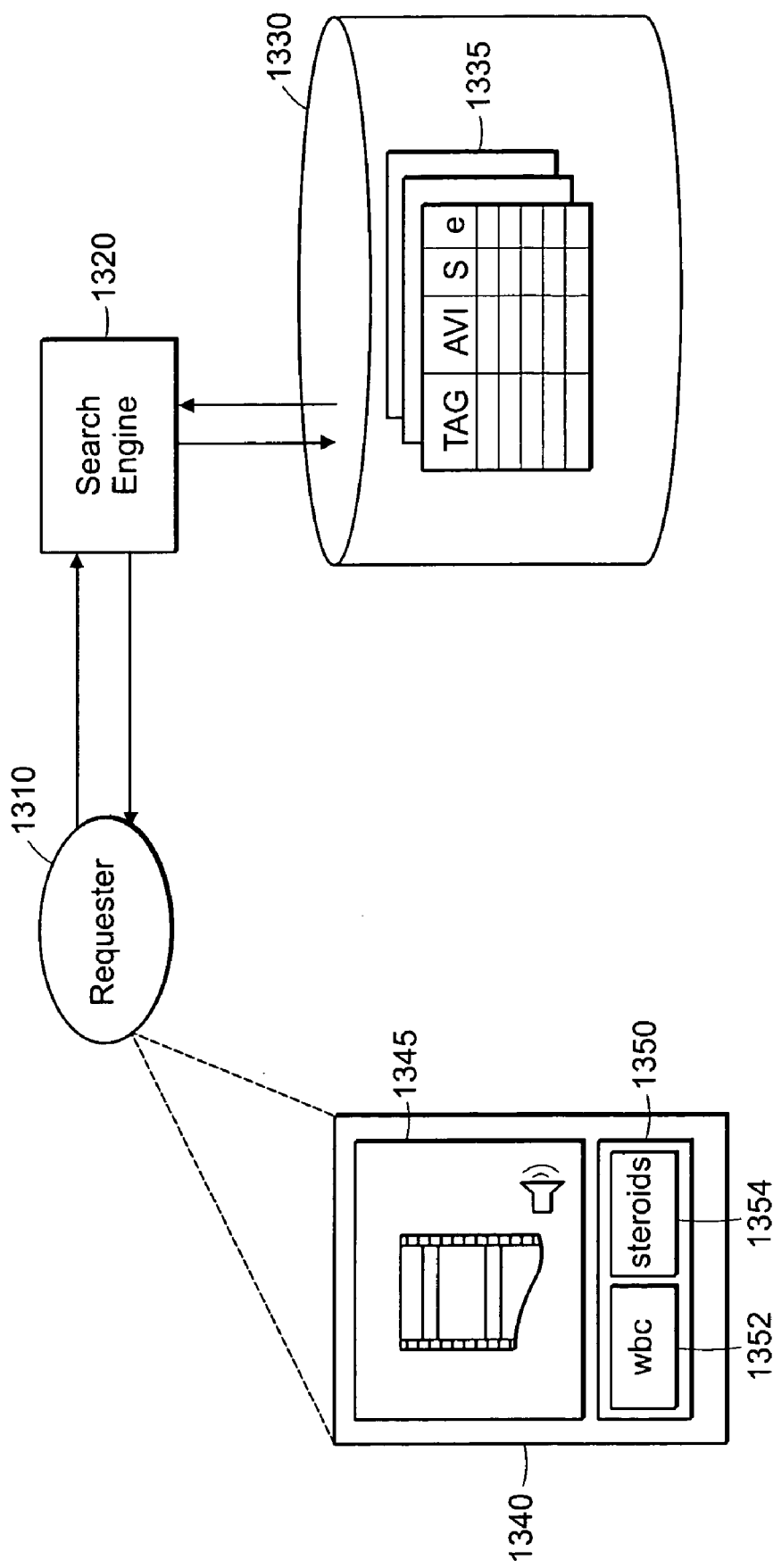
FIG. 11 is a diagram illustrating a system for accessing timed tagged media content from a search engine.

With the timed tag indexes 1250, 1255, a search engine, or other online system, can enable a user to request audio/video content based on a specific tag and, in return, provide such content in a manner such that the user can readily access the desired segment of content associated with the desired tag. For example, FIG. 11 is a diagram illustrating a system for accessing timed tagged media content from a search engine. As shown, the system 1300 includes a search engine 1320 or other server capable of accessing database 1335. The database 1335 includes one or more timed tag indexes 1335 that map a tag to timed segments of one or more media files. Alternatively, each of the timed tag indexes 1335 can map timed segments of a particular media file to one or more provider-defined or automatically generated tags.

In operation, a client requestor 1310 establishes a session with the search engine 1320 and transmits a request for audio/video content associated with one or more tags (e.g. tag="steroids"). In response the search engine 1320 access the timed tag indexes 1335 to identify each of the timed segments that correspond to the requested tag. The search engine can then generate instructions to present one or more of timed tagged segments of media content to the request via a browser interface 1340, for example. For purposes of example only, FIG. 11 illustrates a browser interface 1340 that presents a media player 1345 and a toolbar 1350 for jumping between the tagged timed segments. In this example, the toolbar 1350 includes a button 1352 for jumping to the timed segment associated with the tag "world baseball classic." and another button 1354 for jumping to the timed segment associated with the tag "steroids." Any number of different ways can be implemented for presented timed tagged segments to a user.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit (IC), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks. Communication networks can also all or a portion of the PSTN, for example, a portion owned by a specific carrier.

The computing system can include clients and servers. A client and server are generally remote from each other and typically interact through a communication network. The relationship of client and server arises by virtue of computer programs running on the respective computers and having a client-server relationship to each other.

While this invention has been particularly shown and described with references to preferred embodiments thereof, it will be understood by those skilled in the art that various changes in form and details may be made therein without departing from the scope of the invention encompassed by the appended claims.

What is claimed:

1. A computer implemented method of timed tagging of media content, comprising:

obtaining at least one keyword tag associated with discrete media content;

generating a timed segment index of discrete media content, the timed segment index identifying (i) content segments of the discrete media content and corresponding timing boundaries of the content segments and (ii) word segments within each content segment, each word segment identifying an audible word and corresponding timing boundaries of the audible word within the discrete media content;

deriving text from the word segments within the discrete media content using either closed caption data or speech recognition processing associated with the discrete media content;

obtaining the corresponding timing boundaries for the word segments matching the at least one keyword tag;

identifying timing boundaries of one or more content segments from the timed segment index that includes the corresponding timing boundaries of the matching word segments by automatically extending the timing boundaries for the matching word segments to coincide with the timing boundaries of one or more of the content segments;

generating a timed tag index that associates the at least one keyword tag with the extended timing boundaries corresponding to the identified one or more content segments of the discrete media content containing the matching word segments;

aligning text from the closed caption data or speech recognition processing to the timing boundaries corresponding to the content segments of the discrete media content; and storing the timed tag index in a database such that the timed tag index may be accessed via a search engine, thereby facilitating the retrieval of discrete media content in response to a user query.

2. The computerized method of claim 1 wherein the word segments comprise audible words.

3. The computerized method of claim 1 further comprising: receiving the keyword tag from a content provider, the keyword tag being associated with the discrete media content by the content provider.

4. The computerized method of claim 1 further comprising: receiving the keyword tag from a content provider, the keyword tag being uploaded along with the discrete media content by the content provider.

5. The computerized method of claim 1 further comprising: receiving the keyword tag from a content provider, the keyword tag being embedded in a content descriptor corresponding to the discrete media content provided by the content provider.

6. The computerized method of claim 1 further comprising: generating the keyword tag from the timed segment index.

7. The computerized method of claim 1 further comprising: in response to a query containing the at least one keyword, presenting a search result that enables a user to arbitrarily select and commence playback of the content segment within the discrete media content.

8. The computerized method of claim 1 wherein one or more of the content segments identified in the timed segment index include word segments, audio speech segments, video segments, or marker segments.

9. The computerized method of claim 1 wherein one or more of the content segments identified in the timed segment index include audio corresponding to an individual word, audio corresponding to a phrase, audio corresponding to a sentence, audio corresponding to a paragraph, audio corresponding to a story, audio corresponding to a topic, audio within a range of volume levels, audio of an identified speaker, audio during a speaker turn, audio associated with a speaker emotion, audio separated by sound gaps, audio separated by markers embedded within the media content or audio corresponding to a named entity.

10. The computerized method of claim 1 wherein one or more of the content segments identified in the timed segment index include video of individual scenes, watermarks, recognized objects, recognized faces, overlay text or video separated by markers embedded within the media content.

11. An article of manufacture having computer-readable storage program portions embodied thereon for timed tagging of media content, the article comprising computer-readable instructions for:

obtaining at least one keyword tag associated with discrete media content;

generating a timed segment index of discrete media content, the timed segment index identifying (i) content segments of the discrete media content and corresponding timing boundaries of the content segments and (ii) word segments within each content segment, each word segment identifying an audible word and corresponding timing boundaries of the audible word within the discrete media content;

deriving text from the word segments within the discrete media content using either closed caption data or speech recognition processing associated with the discrete media content;

obtaining the corresponding timing boundaries for the word segments matching the at least one keyword tag;

identifying timing boundaries of one or more content segments from the timed segment index that includes the corresponding timing boundaries of the matching word segments by automatically extending the timing boundaries for the matching word segments to coincide with the timing boundaries of one or more of the content segments;

generating a timed tag index that associates the at least one keyword tag with the extended timing boundaries corresponding to the identified one or more content segments of the discrete media content containing the matching word segments;

aligning text from the closed caption data or speech recognition processing to the timing boundaries corresponding to the content segments of the discrete media content; and storing the timed tag index in a database such that the timed tag index may be accessed via a search engine, thereby facilitating the retrieval of discrete media content in response to a user query.

* * * * *